United States Patent [19]

Wirz et al.

[11] 3,960,451

[45] June 1, 1976

[54] DAMPENING SYSTEM ON AN OFFSET PRINTING PRESS WITH A DEVICE FOR REGULATING THE AMOUNT OF WATER ON THE PLATE

[75] Inventors: Burkhardt Wirz; Peter Decker, Munich, both of Germany

[73] Assignees: Grapho Metronic GmbH & Co.; Roland Offsetmaschinenfabrik Faber & Schleicher AG., Germany

[22] Filed: Mar. 14, 1975

[21] Appl. No.: 558,307

[30] Foreign Application Priority Data

Mar. 14, 1974 Germany ............................ 2412234

[52] U.S. Cl. ................................ 356/161; 356/205; 250/573; 101/350

[51] Int. Cl.² ........................................ G01B 11/00

[58] Field of Search ........... 250/573, 576, 574, 226, 250/564, 565; 356/161, 202, 204, 205; 101/147, 148, 350

[56] References Cited

UNITED STATES PATENTS

| | | | |
|---|---|---|---|
| 3,185,024 | 5/1965 | McCreanor | 356/161 X |
| 3,260,850 | 7/1966 | Bunge et al. | 250/226 X |
| 3,439,175 | 4/1969 | Kammuller et al. | 356/161 X |
| 3,661,462 | 5/1972 | Natens | 250/226 X |
| 3,800,699 | 4/1974 | Carley | 101/147 |
| 3,835,777 | 9/1974 | Krygeris | 101/350 |

*Primary Examiner*—Walter Stolwein
*Attorney, Agent, or Firm*—Wolfe, Hubbard, Leydig, Voit & Osann, Ltd.

[57] ABSTRACT

Means for measuring and correctively changing the thickness of a film of water on the plate of an offset printing press which includes a light source forming a spot of light on the plate with light pick-up means including a photocell producing an output signal in response to remitted light. A disc carrying two filters in symmetrically spaced sectors is interposed in the path of the light reaching the photocell. The first filter is a band pass filter which passes a wavelength slightly separated from a maximum light absorption band of water. The second filter passes a wavelength which is well separated from the maximum light absorption band of water and which lies in a region of where there is minimum change of absorption as a function of film thickness. As a result the photocell is subjected to an alternating series of "measuring" light pulses and "reference" light pulses through the respective filters. Means are provided responsive to the pulsating output signal of the photocell to provide a direct indication of film thickness. In a preferred form of the invention a water fountain roller is driven at a variable speed, and a servo system is interposed between the photocell and the motor which drives the fountain roller for constant corrective variation in speed to maintain the film thickness automatically at a desired level.

2 Claims, 8 Drawing Figures

DAMPENING SYSTEM ON AN OFFSET PRINTING PRESS WITH A DEVICE FOR REGULATING THE AMOUNT OF WATER ON THE PLATE

Efforts have been made in the past to measure the thickness of a transparent film of water or the like on a moving surface by forming a spot of light on the surface and by picking up the reflected light in a photocell, the light having a wavelength of 1.93 microns corresponding to a light absorption band of water as discussed in *Chemie-Ingenieur Technik* 1963, No. 1. It has also been known to measure the amount of water on the plate of a lithographic printing press using a wavelength of about 2.95 microns which is at a maximum light absorption band of water, as disclosed in German Pat. No. 1,303,819 and U.S. Pat. No. 3,439,175. In the *Archiv fur Technisches Mesen* (Sheet V, 1124-12 January, 1966) it is brought out that performing the measurement at a wavelength of maximum light absorption results in a high degree of measuring sensitivity.

The procedure disclosed in the German and U.S. patents, while useful for measurement of the thin films of water employed in normal lithographic techniques, has been found to be unsuited for use in lithographic presses employing new types of plates coming into wide usage and requiring a thicker film of water, for example, eloxated plates employed in both sheet printing and web printing.

Specifically in U.S. Pat. No. 3,439,175, in which the present inventor Wirz was coinventor, it is recommended that the wavelength of "measuring" light be 2.95 microns since such wavelength is a point of maximum absorption. It has subsequently been discovered that to achieve linearity in the case of thick films it is desirable to depart from the maximum absorption value by approximately 0.15 micron and in any event by a difference of between 0.05 and 0.25 micron.

It is, accordingly, an object of the present invention to provide means for measuring the thickness of a film of water on a moving lithograhic printing plate which is not only capable of measurement of thin films used in conventional presses but which is especially intended for accurate measurement of thick films used with plates of the eloxated type. It is a related object of the invention to provide a film thickness measuring arrangement which produces an output signal which is substantially linear over a wide range of film thickness, for example, a range of up to 10 microns.

It is a still further object of the present invention to provide means for measuring the thickness of a water film over a wide range which is easy to use, which is stable in operation, and which includes a built-in reference so as to largely overcome, and cancel out, such extrenuous factors as variations in plate surface, variable ambient light, effects of aging upon the light source and photocell, etc.

It is a more specific object of the present invention to provide an automatic control of water film thickness in a lithograph press which employs measuring pulses of light and reference pulses of light applied in alternate sequence to produce an output signal having a component which varies in accordance with the difference in level of the pulses and having a servo system for bringing about a corrective change in the speed of the water fountain roller for automatically maintaining a water film of predetermined thickness on the surface of the printing plate.

Other objects and advantages of the invention will become apparent upon reading the attached detailed desciption and upon reference to the drawings in which:

FIG. 1 is an elevational diagram showing a lithographic plate cylinder with associated means for applying films of ink and water to the surface thereof.

FIG. 1*a* is a block diagram of an exemplary simple type of servo system which may be used with the system of FIG. 1.

Figure 7:
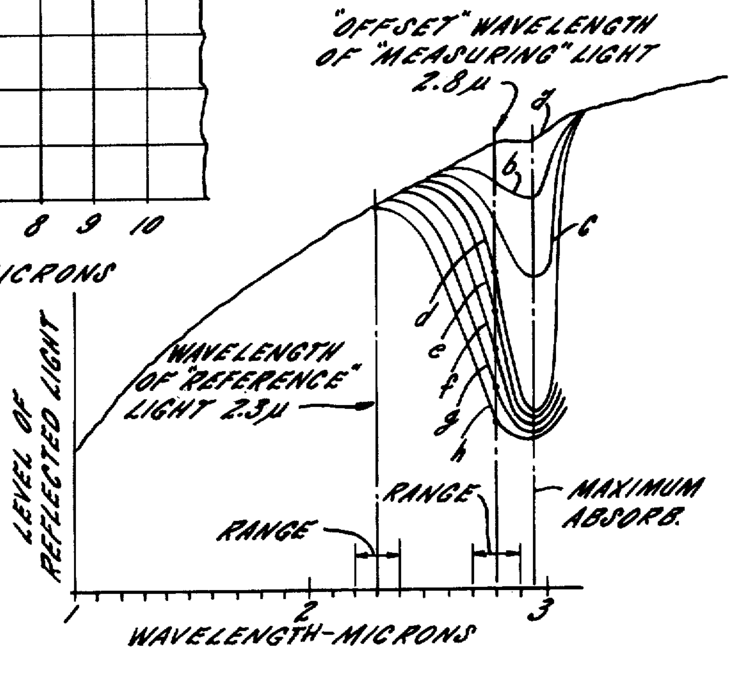

FIG. 7 postulates the reason for the observed improvement in linearity in the case of the thicker films.

While the invention has been described in connection with certain preferred embodiments, it will be understood that it is not intended to limit the invention to the embodiments shown but it is intended, on the contrary, to cover the various alternative and equivalent constructions included within the spirit and scope of the appended claims.

Figure 1:
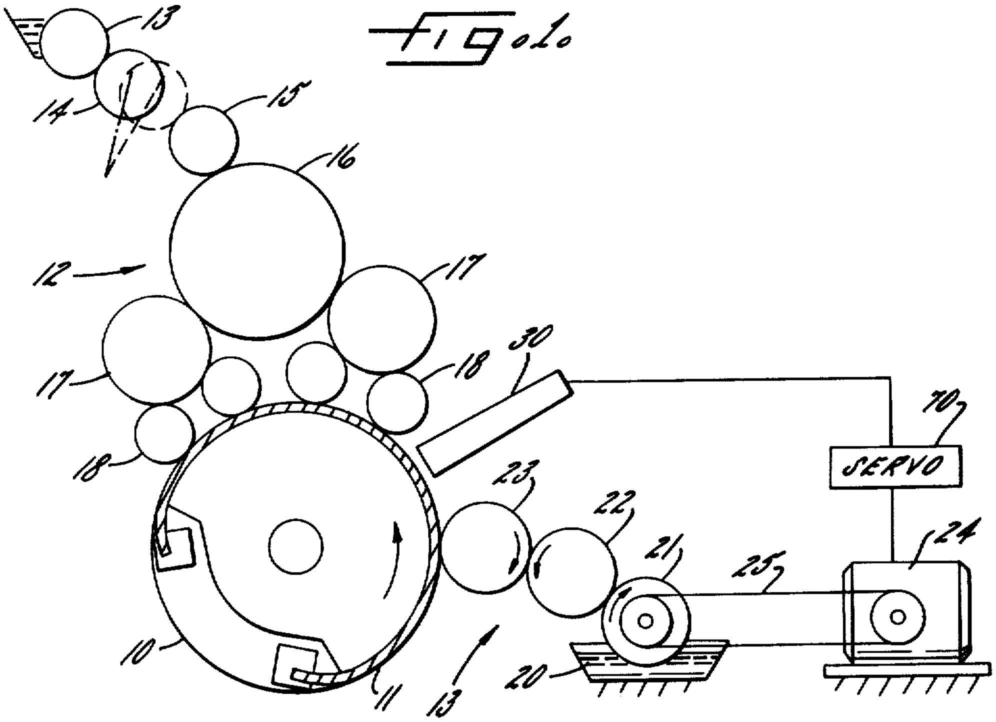

Referring now to FIG. 1 of the drawings there is disclosed a portion of a lithograph press including a lithograph plate cylinder 10 having a plate 11 fed by an inking system 12 and a water system 13. The inking system includes an ink fountain having a fountain roller 13 and an associated ductor roller 14 which transfers ink via a roller 15 to a rubber covered distributor drum 16. The latter feeds hard surfaced drums 17 which are conventionally vibrated and which transmit the ink in the form of a thin, even film via a set of rubber covered form rollers 18, the ink adhering to the ink receptive areas of the plate.

For applying a water film to the plate, the water fountain, indicated at 20, has a water fountain roller 21 which applies the water film, via an intermediate roller 22 to a water form roller 23. The fountain roller is driven at a relatively slow speed by a variable speed motor 24, the output shaft of which is coupled to the fountain roller by a belt 25. It will be understood that both the ink feed system and water feed system are shown in rudimentary form and that such systems will be understood, in a practical case, to include the various developments and improvements which are representative of the state of the art.

Figure 2:
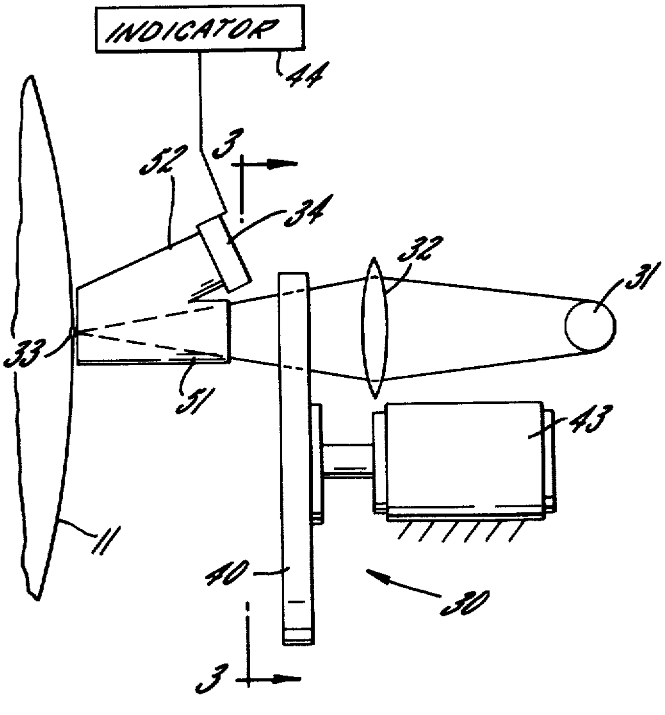
FIG. 2 is a diagram showing a measuring assembly of the present invention in elevation.
Figure 4:
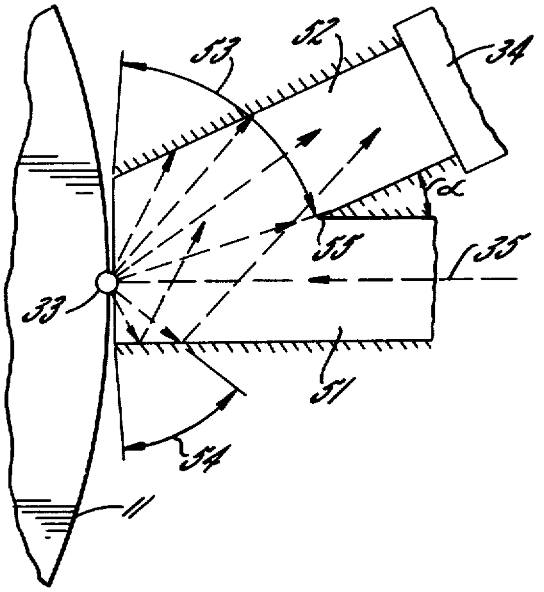
FIG. 4 is an elevational diagram showing the light tubes in section and the path of the incident and remitted light.

For the purpose of measuring the thickness of the film of water on the plate 11, a thickness measuring assembly 30 is provided (FIG. 2) having a light source in the form of a lamp 31 and a lens 32 for converging a spot of light 33 upon the surface of plate 11. Light from the spot 33 proceeds to a photocell 34 having a pick-up axis oriented generally in the direction of the spot. As illustrated in FIG. 4 the incident beam from the light source 31 is indicated at 35. The light upon striking the water film on the surface of the plate is remitted to the photocell. It will be understood that the term "remitted light" refers to the light which is diffusedly reflected by the water film and which is indicated by the reflection arrows in FIG. 4, as contrasted with the light which is specularly reflected. In carrying out the present invention the incident light 35 is applied at right angles to the film and, consequently, the specularly reflected light is transmitted from the spot 33 back along line 35, but with only a slight spreading tendency because of the convex nature of the plate.

In accordance with the present invention two filters are interposed in the path of the light, the first filter having a narrow pass band at a wavelength slightly separated from a maximum light absorption band of water and the second filter having a pass band which is well separated from the maximum light absorption band of water and which lies in a region where there is a minimum change of absorption as a function of film thickness. In the preferred construction the filters are mounted upon a disc 40, with the filters, indicated at 41, 42, occupying symmetrically located sectors, or windows, in the disc. The disc is driven by a motor 43 at a fixed but adjustable speed.

The first band pass filter 41 is selected to pass a wavelength of light which does not correspond to a maximum light absorption band of water, as in the prior art, but which is slightly separated from the maximum light absorption band. It is known, for example, in the above identified German patent, that a maximum light absorption band for a water film occurs at a wavelength of approximately 2.95 microns. In accordance with the invention such wavelength is intentionally avoided, and the first filter 41 is, instead, chosen to pass a narrow band of light which is slightly separated therefrom, a wavelength in the range of 2.7–2.9 microns being preferred. The light at the latter wavelength, upon being chopped by the disc 40, produces a series of "measuring" light pulses which are picked up by the photocell 34 to produce a component of the output signal.

Further in accordance with the invention the band pass filter 42 is selected to pass a wavelength which is well separated from the maximum light absorption band of water (that is, well separated from the wavelength of 2.95 microns) and which lies in a region of wavelength found to produce a minimum change of absorption of the light as a function of film thickness. As a result, the light passed by the filter 42, and remitted at the surface of the plate 11, causes a level of remitted light which remains substantially constant over a wide range of variation in film thickness, with the result that the remitted light at the second wavelength serves as a convenient source of "reference" pulses which are alternated with the "measuring" pulses and which serve as a base of reference for measurement purposes.

We have found that where "measuring" pulses having a wavelength of 2.8 microns are used, the "reference" pulses may have a wavelength lying within the range of 2.2 to 2.4 microns and which is preferably at a level of 2.3 microns.

Alternatively, in accordance with the invention, "measuring" pulses may be used which have a wavelength on the "outer side" of the point of maximum absorption, specifically in a range of 3.0 to 3.3 microns, in which case the "reference" pulses may lie in the range of 3.4 to 3.7 microns.

As a result of using the "measuring" and "reference" light pulses at the wavelengths given, and alternating them in time sequence, the output signal produced by the photocell 34 is in the form of electrical "measuring" and "reference" pulses, the difference in magnitude of which constitutes a direct measure of film thickness. The difference in magnitude may be visually indicated by any suitable indicator 44, a matter well within the skill of the art.

In accordance with one of the more detailed aspects of the present invention a first tube, or tunnel, 51 is provided for confinement of the incident light 35 and a second tube or tunnel, intersecting at a shallow angle with the first tube, is provided for gathering the remitted light and for transmitting it to the photocell. The remitted light falls into two categories, the first being the light within the arc 53 which, remitted at the spot 33, is passed directly into the photocell 52, and the second being the light within the arc 54 which is reflected upon the inner wall of the tube 51 and which is, upon reflection, transmitted into the tube 52. To make efficient use of the remitted light, including the light within the arc 54, the two tubes 51, 52 preferably intersect at a point 55 which is well spaced, radially, from the water film. Using tubes having a diameter on the order of 0.4 inch, the spacing of the point of intersection may be on the order of 0.3 inch. To improve the reflection of the remitted light within the tubes, the tubes are preferably internally coated with a layer of reflecting material, for example, a layer of flat white paint.

Figure 5:
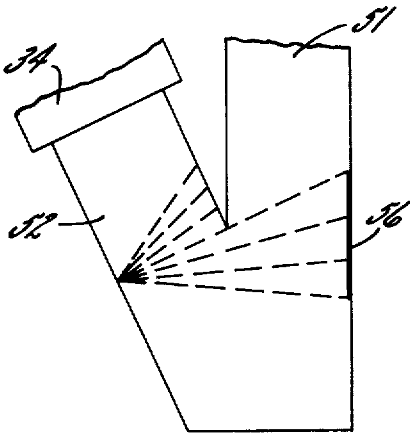
FIG. 5 is a diagram showing the coating, with light absorbent material, of localized interior surface areas capable of direct reflection of light from one tube to the other.

However, to prevent unwanted direct reflection of the light from the wall of the tube 51 to the wall of the tube 52, localized surface areas, capable of such direct short-circuiting reflection are coated with light absorbent material. Referring to FIG. 5, for example, the area 56 within the tube 51 is capable of reflecting light from the source onto the region 57 of the tube 52 from which the light may be reflected to the opposite wall 58 of the tube and thence directly or by multiple reflection into the photocell 34. To prevent this, the side wall area 56 of the tube 51 is preferably coated with a flat black paint, precluding direct transmission of light along the paths indicated by the dashed lines.

In short, the tubes 51, 52, by confining the incident light and by both confining and reflecting the remitted light, with provision for preventing direct short-circuiting of light, increase the efficiency of the system so that the level of output signal from the photocell, for a given level of illumination from lamp 31, is maximized. Experience has shown that the tubes should intersect at a relatively sharp acute angle, the angle $\alpha$ in FIG. 4 being in the neighborhood of 20°.

Figure 6:
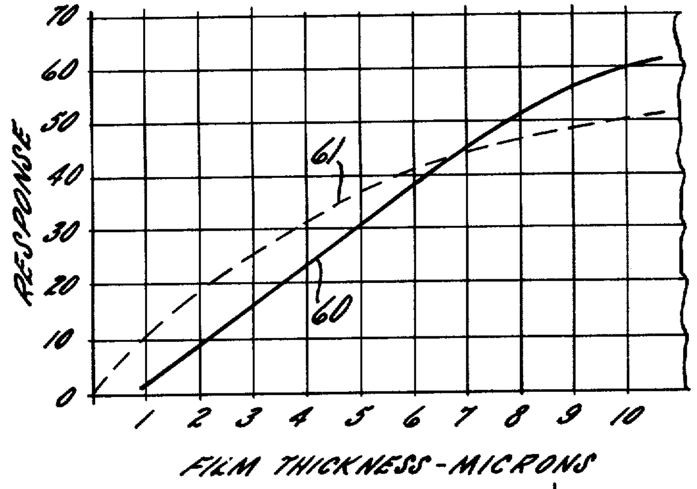
FIG. 6 shows a variation in response as a function of film thickness characteristic of the present device.

As a result of the use of the two filters 41, 42 described above a substantially linear response curve is produced with the linearity extending over the region of thin and thick films from a thickness of less than 1 micron to a thickness on the order of 10 microns, which includes the entire range of film thickness normally encountered in modern lithograph presses including presses utilizing plates of the eloxated type. The response curve, indicated at 60 in FIG. 6, is to be contrasted with a typical response curve obtained using prior techniques having a wide variation in slope and which is indicated by the dotted line 61 in FIG. 6.

In an effort to explain the improved result brought about by use of filters of the wavelength specified, the characteristic curve illustrated in FIG. 7 has been postulated. This figure, which is for explanatory purposes only, and which does not necessarily represent observed data, shows a family of absorption curves for different thicknesses of film. This figure shows that the level of reflected light, as a function of wavelength, has a maximum light absorption band at approximately 2.95 microns. In the case of an extremely thin, almost non-existent, film of water as indicated at *a* there is very little light absorption, i.e. there is good reflection. However, as the film thickness is increased progressively as shown by curves *b–h* the amount of absorption of light increases. Most of the change in absorption at the maximum absorption frequency of 2.95 microns occurs within the range of *a–d* which accounts for the relatively high slope of the initial portion of curve 61. As the film thickness increases, as evidenced by curves *d–h* the amount of change in the level of absorbed light becomes extremely small, accounting for the flattening of the curve 61 over the region of large film thickness, resulting in a complete loss of measurement sensitivity in this region.

By deliberately departing from the wavelength of maximum light absorption and by employing a first band pass filter having a wavelength which is slightly separated from the wavelength of maximum absorption, an entirely different situation obtains. Specifically by using a filter on the order of 2.8 microns the level of reflected, and conversely, absorbed, light is found to change more or less linearly with film thickness as shown by the relatively evenly spaced points of intersection between the curves *d–h* and the "2.8 micron line". Thus it becomes possible, for the first time, to measure sensitively, reliably and with relative accuracy, water film thicknesses over the entire range of utility, that is, up to and even exceeding 10 microns.

While it is preferred using a "measuring" wavelength slightly separated from 2.95 microns, it will be understood that the invention is not necessarily limited to the above wavelengths and measuring wavelengths may be used which are offset from other points of maximum absorption within the range of 0 to 10 microns. For example there is another well defined light absorption band at approximately 6 microns. Consequently, the wavelength of 6 microns is, in accordance with the invention, avoided, and measuring wavelengths separated therefrom are utilized. Such measuring wavelengths should preferably lie within the range of 5.7 to 5.9 microns on the lower side or from 6.1 to 6.3 microns on the upper side. Using such "measuring" wavelengths it is preferred to employ "reference" wavelengths whch are still further separated from the 6 micron point of maximum absorption and which lie within the range of 5.4 to 5.6 microns on the lower side and from 6.4 to 6.6 microns on the upper side.

Also, while a rotating disc interposed in the light beam 35 is preferred for mounting of the filters, it will be apparent that the invention is not limited to use of a disc and that other means may be used, if desired, for interposing the two filters in alternating sequence in the path of the light which reaches the photocell. Nor is it essential that the filters be interposed in the path of the incident light. If desired the filters may be interposed in the path of the light directly ahead of the photocell 34.

The invention, for the sake of simplicity, has thus far been described in connection with a suitable indicating device 44 which provides a thickness reading in terms of the difference in magnitude between the measuring and reference pulses. However, in accordance with one of the aspects of the present invention the output of the photocell may be employed, via a servo system 70, to bring about a corrective change in the speed of the fountain roller 21 for automatic maintenance of a water of predetermined thickness on the plate. Such an automatic control system is diagrammed, in exemplary form, in FIG. 1*a*. In this diagram the output of the photocell is fed, via a suitable filter 71 to an a-c. amplifier 72. The filter may, for example, be of the band pass type having a pass frequency which corresponds to the speed of rotation of the filter disc 40, while the a-c. amplifier will be understood to be of the type which accepts, and responds to, only the a-c. component of the input signal.

To enable direct voltage follow-up, the output of the a-c. amplifier 72 is rectified by a rectifier 73 and the resulting d-c. signal is smoothed by a filter capacitor 74.

To provide a feedback signal which is proportional to the speed of the motor 24 which drives the fountain roller 21, the motor is connected to a tachometer 75 having a settable potentiometer 76. The voltage across the capacitor 74 is added to the slider voltage of the potentiometer 76, and the resultant is fed into a suitable d-c. amplifier 77 which drives the motor 24 at a speed which is proportioned to the amplifier output voltage. An indicator 44 may be added in the form of a d-c. volt meter connected across capacitor 74.

In operation, a change in the thickness of the water film, resulting in a change in the differential between the "measuring" and "reference" output pulses of the photocell, results in a corresponding change in the voltage at the output of rectifier 73. This produces a corrective change in the speed of the motor 24 which drives the water fountain roller, resulting in change in the tachometer voltage so that the speed of the motor 24 is established at a new equilibrium level corresponding to a new film thickness.

Figure 1A:
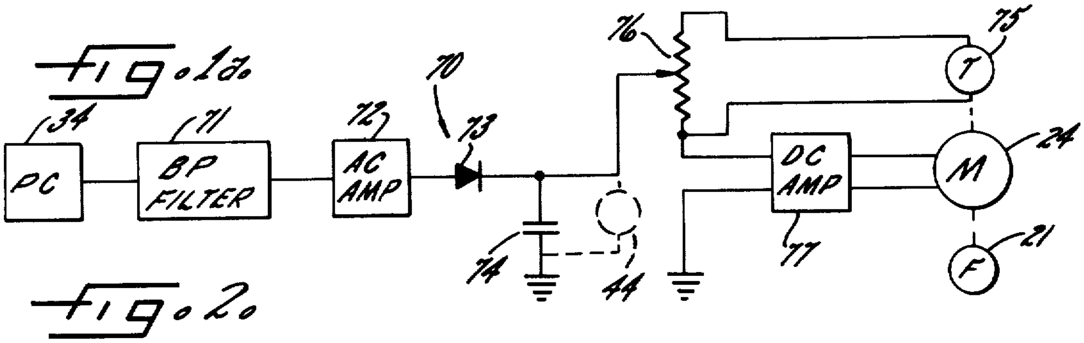
Figure 3:
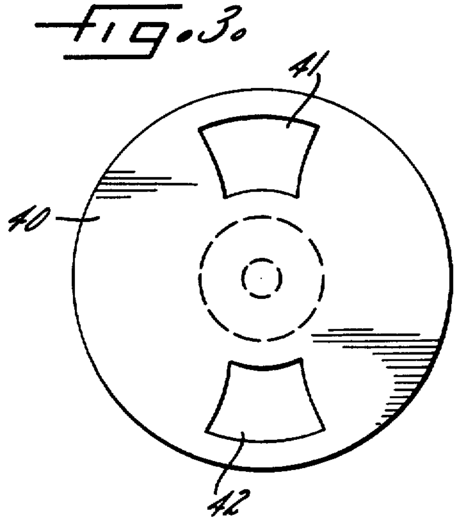
FIG. 3 is a view of the rotating filter disc looking along the line 3—3 in FIG. 2.

The servo system set forth in FIG. 1*a* is intended for purposes of explanation, and it will be apparent to one skilled in the art that the invention includes alternative and equivalent means for utilizing the output of the photocell 34 for either giving indication of film thickness or for bringing about a corrective change so that a desired film thickness is automatically maintained. An alternate and more sophisticated means for producing a signal proportional to the differential height of the "measuring" and "reference" pulses is to be found in prior U.S. Pat. No. 3,439,175 (FIG. 3) in the name of one of the present co-inventors.

In the above disclosure of the invention water has been assumed as the dampening medium. The invention is not limited to use of water, and where water substitutes are used, the measuring and reference wavelengths will be offset, in the manner described, from the observed maximum absorption frequencies of the substitute. The term "direct indication of film thickness" as used herein is intended to be generic to a visual indicator and to a servo system. Where a range of wavelength is set forth it will be understood that a narrow pass band is intended occupying a position within the range, as contrasted with occupying the entire range.

We claim:

1. In a dampening system for a printing plate of an offset printing press, means for measuring the thickness of a film of water on the moving plate comprising, in combination, a light source forming a beam of light directed at the water film to form a spot of light thereon, light pick-up means including a photocell having a pick-up axis directed at the spot of light so as to produce an output signal responsive to the remitted light, a first band pass filter passing a wavelength (slightly) separated from a maximum light absorption band of water by a difference in wavelength lying within the range of 0.05 and 0.25 micron, a second band pass filter passing a wavelength which is (well) separated from the maximum light absorption band of water by at least about 0.5 micron and which lies in a region of minimum change of absorption with film thickness, means for interposing the filters in time sequence in the path of the light reaching the photocell so that the photocell is subjected to an alternative series of measuring light pulses and reference light pulses through the respective filters, and means responsive to the pulsating output of the photocell for providing a direct indication of film thickness, the degree of separation of the first band pass filter from the maximum light absorption band of water being such as to provide improved linearity of the photocell output signal extending into the range of maximum film thickness.

2. The combination as claimed in claim 1 in which the first band pass filter has a pass band separated from the maximum light absorption band by a difference in wavelength of about 0.15 micron.

* * * * *